United States Patent [19]
Fazio

[11] Patent Number: 5,284,674
[45] Date of Patent: Feb. 8, 1994

[54] POWDERED DAIRY CREAMER

[76] Inventor: Susan C. Fazio, P.O. Box 302, Oldwick, N.J. 08858

[21] Appl. No.: 881,485

[22] Filed: May 11, 1992

[51] Int. Cl.$^5$ .............................................. A23C 11/02
[52] U.S. Cl. ..................................... 426/580; 426/585; 426/586; 426/588; 426/589; 426/602; 426/604
[58] Field of Search ............... 426/580, 602, 585, 586, 426/589, 611, 588, 604

[56] References Cited

U.S. PATENT DOCUMENTS

| | | | |
|---|---|---|---|
| 3,620,757 | 11/1971 | Ellinger | 426/585 |
| 3,695,889 | 10/1972 | Ingeron | 426/585 |
| 4,242,364 | 12/1980 | Buddemeyer et al. | 426/613 |
| 4,784,865 | 11/1988 | Baker et al. | 426/580 |
| 5,135,768 | 8/1992 | Campbell et al. | 426/585 |

Primary Examiner—Helen F. Pratt
Attorney, Agent, or Firm—Peter Butch, III

[57] ABSTRACT

Powdered dairy creamer compositions are disclosed, formed by drying an emulsion containing from about 5% to about 45% by weight of an edible fat component, including one or more edible fats, from about 5% to about 75% by weight of nonfat dry milk solids, from about 0.1% to about 1.0% by weight of a hydrophilic emulsifier and from about 0.05% to about 0.5% by weight of a lipophilic emulsifier, wherein the hydrophilic emulsifier and the lipophilic emulsifier are present in a ratio of about 2:1, and one or more emulsion stabilizers present in an amount effective to stabilize the emulsion without the presence of the stabilizer being perceptible with respect to the organoleptic properties of the composition. Methods of forming the powdered dairy creamer compositions are also disclosed.

16 Claims, No Drawings

POWDERED DAIRY CREAMER

BACKGROUND OF THE INVENTION

The present invention relates to a powdered dairy product for creaming liquids such as coffee, tea and similar beverages, soups and other edible liquid food products. In particular, the present invention relates to a powdered dairy product for these beverages providing superior organoleptic properties resembling fresh cream.

Non-dairy coffee whiteners have become of increasing importance in the food industry because of their ease of handling and unrefrigerated shelf stability. Their success has been attributed, in part, to economics, particularly when compared with the relatively high cost of fluid dairy products and, in part, to the consumer appeal associated with a low cholesterol content from being formulated without butter fat. However, such products lack the taste, mouthfeel and other desirable organoleptic properties of cream.

As disclosed in U.S. Pat. No. 4,046,926 to Gardiner, typical non-dairy creamers contain from 20%–40% by weight on a dry basis of fat, from 3%–15% by weight of sodium caseinate, from 35%–65% by weight carbohydrate, together with an optional emulsifier and buffering agent, which are formed into an emulsion and spray-dried. Such non-dairy creamers, when added to coffee, function to whiten or lighten the coffee and to neutralize coffee acids to produce a smoother, milder and more mellow coffee drink.

This patent also discloses that attempts to replace sodium caseinate with other water dispersible proteins such as soy protein have proved unsuccessful. The other proteins produced off-flavors, feathering of the protein in the coffee, fat separation, poor whitening properties and other problems.

U.S. Pat. No. 4,784,865 discloses a typical powdered non-dairy coffee creamer containing 35% by weight of a hydrogenated vegetable fat or oil, 55.25% by weight of a carbohydrate such as corn syrup solids, 5.25% by weight of a protein such as sodium caseinate, 2.5% by weight of an emulsifier such as monodiglyceride and 2% by weight of a stabilizing/buffering agent such as dipotassium phosphate. This patent further discloses that the protein functions when the product is reconstituted in coffee to encapsulate the oil or fat droplets and bind water, thereby preventing separation of the fat and coalescence of the droplets to form undesirable fat globules on the surface of the coffee. The stabilizing/buffering salts function to improve the colloidal dispersability of the protein and prevent what is termed "protein feathering" or precipitation of the protein from the acidity of the drink to which the whitener is added. U.S. Pat. No. 4,415,600 to Miller discloses another typical non-dairy coffee creamer containing from 2-50% of a vegetable oil, from 2.5%-5.5% casein, a buffering agent and an emulsifying agent, with the remainder being carbohydrate.

With respect to dairy coffee creamers, U.S. Pat. No. 2,933,393 discloses a powdered coffee creamer having from 15%–42% edible fat, lacteal nonfat solids having a calcium to phosphorus ratio below 0.85, and an added lactose equivalent to between 15% and 65% by weight, with over 62% of the lactose being in beta form. The creamer is prepared by condensing cream with whole milk or skim milk having a reduced calcium content and adding lactose to the mixture, which is then spray-dried. The process requires heat treatment of the mixture prior to spray-drying at a temperature between 203° and 250° F. for 1 to 20 seconds in order to convert the lactose to over 62% beta-lactose. The beta-lactose is disclosed as improving product solubility. However, many individuals are lactase-deficient and therefore lactose intolerant, particularly at the levels of lactose disclosed by this patent.

There remains a need for a powdered dairy coffee creamer having the organoleptic properties of cream when added to coffee.

SUMMARY OF THE INVENTION

These needs are met by the present invention. In accordance with the present invention, it has thus been discovered that combinations of an edible fat which is solid or semi-solid at room temperature and nonfat dry milk solids, appropriately emulsified and stabilized, can be spray-dried to form a powdered dairy creamer having the organoleptic properties of fresh cream. Therefore, in accordance with the present invention, there is provided a powdered dairy creamer composition formed by drying an emulsion containing:

from about 5% to about 45% by weight of an edible fat component comprising one or more edible fats;

from about 5% to about 75% by weight of nonfat dry milk solids;

from about 0.1% to about 1.0% by weight of a hydrophilic emulsifier and from about 0.05% to about 0.5% by weight of a lipophilic emulsifier, wherein the hydrophilic emulsifier and the lipophilic emulsifier are present in a ratio of about 2:1; and one or more emulsion stabilizers, present in an amount effective to stabilize said emulsion without the presence of said stabilizer being perceptible in the organoleptic properties of said composition.

Preferred aspects of the present embodiment utilize a vegetable fat or oil as the edible fat, which vegetable fat or oil preferably is unsaturated. Another preferred aspect of the present embodiment utilizes higher levels of edible fat and nonfat dry milk solids so as to more closely provide the organoleptic properties of fresh cream. An even more preferred aspect of the present embodiment includes vitamin and mineral supplements to provide a product that not only has the organoleptic properties of fresh cream, but is also nutritious as well.

In accordance with the present invention, there is also provided a method for making a powdered dairy creamer composition which exhibits the organoleptic properties of fresh cream, which method includes the steps of:

(a) melting a mixture of one or more edible fats, which mixture is solid at room temperature and is present in a quantity between about 5% and about 45% by weight of said composition;

(b) providing a mixture containing nonfat milk solids in a quantity between about 5% and about 75% by weight of said composition;

(c) preparing an aqueous solution containing one or more emulsion stabilizers in a quantity of water from about 35% to about 60 by weight of the powdered composition;

(d) heating the aqueous solution with agitation to a temperature slightly above the temperature of the melted fat;

(e) combining the melted fat and the aqueous solution together with a hydrophilic emulsifier and a lipophilic emulsifier, wherein the hydrophilic emulsifier is present in a quantity between about 0.1% to about 1.0% by weight of the composition and the lipophilic emulsifier is present in a quantity between about 0.05% to about 0.5% by weight of th composition and the hydrophilic emulsifier and the lipophilic emulsifier are present in a ratio of about 2:1;

(f) pasteurizing the combined melted fat, aqueous solution and emulsifiers at a temperature above the temperature of the melted fat, so that a pre-emulsion is formed;

(g) homogenizing the pre-emulsion at a pressure between about 2000 and about 4000 psi so that an emulsion is formed in which the particles of the melted fat are consistent in size and average about 1 micron or less in diameter; and (h) forming an agglomerate of the nonfat milk mixture and the homogenized emulsion.

Powdered creamers prepared in accordance with this method dissolve readily in a hot beverage such as coffee without feathering or separation of the edible fat. When dissolved in the beverage, the product provides the taste, mouthfeel and other organoleptic properties of fresh cream.

DETAILED DESCRIPTION OF THE PREFERRED EMBODIMENT

The powdered dairy creamer compositions of the present invention contain from about 5% to about 45% by weight of an edible fat component containing one or more edible fats, wherein the component is solid at room temperature. Edible fats suitable for use in the present invention include fats or oils from both animal and vegetable sources. The edible fat which is used is preferably a vegetable fat or oil which is bland or neutral in flavor and contains no cholesterol. Suitable vegetable fats and oils include saturated fats and oils, monounsaturated fats and oils, polyunsaturated fats and oils and mixtures thereof. The vegetable fat or oil is preferably partially hydrogenated. Among the preferred vegetable oils are soybean oil, palm oil, coconut oil, cottonseed oil and canola oil.

The choice of a vegetable fat or oil presents a dilemma, because for dietary purposes, the fat or oil should be unsaturated. On the other hand, unsaturated fats or oils are typically liquid at room temperature and possess poor long-term stability against oxidation and the development of rancidity.

In particular, saturated tropical oils, while more stable, are not healthy, because they raise the LDL cholesterol level in the blood stream. Polyunsaturate fats, on the other hand, do not raise the LDL level significantly, but instead undesirably lower the HDL cholesterol level. Monounsaturated fats are presently considered ideal because they neither raise the LDL level or lower the HDL level.

For this reason, an edible fat component of one or more partially hydrogenated vegetable fats or oils that is solid at room temperature and possesses acceptable long-term stability against oxidation and the development of rancidity is preferred for use in the present invention. In addition, the melting temperature of the fat should not be so high that the powdered creamer possesses a waxy mouth-feel when used in coffee.

A particularly preferred partially hydrogenated vegetable oil is Karlsham SUPER FRY C ™, a partially hydrogenated blend of soybean oil and cottonseed oil, with soybean oil predominating. This oil contains 28% saturated fats, 64% monounsaturates and 8% polyunsaturates, and has a melting point between about 107° F. and about 110° F.

Another particularly preferred partially hydrogenated vegetable oil is Lobra 105, a partially hydrogenated 100% canola oil. This oil contains 20% saturated fats, 75% monounsaturates and 5% polyunsaturates, and has a melting point between about 103° F. and about 107° F.

The edible fat component can also contain medium chain triglyceride oils, which are highly saturated fats that provide 8.3 calories per gram but are metabolized in the body like a carbohydrate. These fats are metabolized almost immediately in the liver like a carbohydrate, rather than being stored in the body like a fat, resulting in a significant reduction in deposits of cholesterol.

Oils or fats selected for the edible fat component should also be substantially free of free fatty acids, which impart an off-taste to the powdered creamer. Free fatty acid levels below 0.05% by weight are preferred.

When the reduction of dietary saturated fat is not an objective, then the preferred fats or oils that are solid at room temperature and possess long-term stability against oxidation and the development of rancidity without imparting a waxy mouth-feel to the powdered creamer when added to a beverage such as coffee are the saturated lauric-containing tropical fats such as coconut oil. When the reduction of dietary cholesterol is not an objective, butter fat is suitable for use with the present invention, and even tallow can be employed to the extent that it does not impart an off-taste to the powdered creamer.

As noted above, the powdered dairy creamer composition can contain from about 5% to about 45% by weight of the edible fat component. Preferably, the powdered creamer composition will contain from about 10% to about 30% by weight of the edible fat component. Powdered dairy creamer compositions containing an edible fat component level of about 20% are most preferred.

Vegetable oils or fats having a melting point between room temperature and 170° F. are preferred. Higher melting point oils or fats require less-forgiving process conditions that can result in denaturing of the milk solids proteins. Those fats or oils having melting points between 100° F. and 120° F. are even more preferred, and the most preferred vegetable fats or oils have melting points between about 105° F. and about 115° F.

The powdered dairy creamer compositions of the present invention also include from about 5% to about 75% by weight of nonfat dry milk solids. Low heat nonfat dry milk solids are preferred for purposes of spray-drying and emulsion stability. As is well understood by those of ordinary skill in the art, low heat nonfat dry milk has not been subjected to the higher temperatures, compared to normal pasteurization temperature, that "high heat" nonfat dry milk is subjected to during drying, that partially denature the milk proteins.

As noted above, the powdered dairy creamer compositions of the present invention can contain from about 5% to about 75% by weight of nonfat dry milk solids. Levels of nonfat dry milk solids between about 30% and about 60% by weight preferred, and powdered dairy creamer compositions containing about 50% by weight of nonfat dry milk solids are most preferred.

The powdered dairy creamer compositions of the present invention also contain from about 0.1% to about 1.0% by weight of a hydrophilic emulsifier and from about 0.05% to about 0.5% by weight of a lipophilic emulsifier. Furthermore, the hydrophilic emulsifier and the lipophilic emulsifier are present in a ratio of about 2:1.

Essentially any hydrophilic or lipophilic emulsifiers suitable for use in a food product can be used with the present invention. Preferred emulsifiers are imperceptible with respect to the organoleptic properties of the powdered dairy creamer composition.

A preferred hydrophilic emulsifier is sodium stearoyl-2-lactolate. Suitable lipophilic emulsifiers include polyoxyethylenated fatty acid esters of polyhydric compounds such as the polysorbate series of polyoxyethylenated sorbitan fatty acid esters. A preferred lipophilic emulsifier is Polysorbate 60, a polyoxyethylenated sorbitan monostearate.

As noted above, the powdered dairy creamer composition can contain from about 0.1% to about 1.0% by weight of the hydrophilic emulsifier. Preferably, the powdered creamer composition will contain from about 0.2% to about 0.80% by weight of the hydrophilic emulsifier and most preferably will contain about 0.3% by weight of the hydrophilic emulsifier. The powdered dairy creamer compositions in accordance with the present invention will also contain from about 0.05% to about 0.5% by weight of the lipophilic emulsifier, and preferably from about 0.1% to about 0.4% by weight. Most preferably, the powdered dairy creamer compositions of the present invention will contain about 0.15% by weight of the lipophilic emulsifier.

The powdered dairy creamer compositions of the present invention also include one or more emulsion stabilizers in an amount effective to stabilize the emulsion without the presence of the stabilizer being perceptible with respect to the organoleptic properties of the composition. Levels of one or more emulsion stabilizers between about 3% to about 10% by weight are suitable for use in the present invention. Examples of suitable emulsion stabilizers that can be utilized at levels between about 3% and about 10% by weight include dextrins, maltodextrins, modified food starches, corn syrup solids, lecithin, microcrystalline cellulose, carrageenan, rice starch, marine colloids, vegetable gums, such as gum arabic, and whey. Preferably, the whey is 50% demineralized or greater.

Maltodextrins suitable for use with the present invention have a Dextrose Equivalent (DE) between about 2 and about 20, more preferably between about 5 and about 15, and most preferably about 10. Preferred corn syrup solids have a DE greater than 20. Modified food starches suitable for use as emulsion stabilizers are well-known to those of ordinary skill in the art and selected for their encapsulating ability. Preferred modified food starches are based on waxy maize. Examples of modified food starches suitable for use with the present invention are N-CREAMER 46 ®, CAPSUL ® and N-LOK ®, all of which are available from National Starch and Chemical Corporation of Bridgewater, N.J.

Certain emulsion stabilizers possessing other desirable properties can be utilized at levels up to about 2% by weight. Higher levels cannot be utilized, otherwise the presence of the stabilizers would be perceptible with respect to the organoleptic properties of the composition. The stabilizers include caseinate salts such as sodium and potassium caseinate. In addition to stabilizing the emulsion, caseinates also function as emulsifiers and give whitening power, body and creaminess to the product. Calcium caseinate is less preferred because it forms insoluble products in the composition.

Another type of emulsion stabilizer that must be utilized at lower levels are citrate salts such as sodium or potassium citrate. The citrates contribute to the whitening effect of the creamer composition and also function as a pH buffer to prevent feathering or curdling when the powdered creamer composition is added to an acidic medium such as coffee. The citrates thus prevent heat, pH and chemical damage to the nonfat dry milk proteins that otherwise result in coagulation of the powdered creamer composition in acidic beverages. Calcium citrate is less preferred because, like calcium caseinate, it forms insoluble products in the composition.

Dipotassium and tripotassium phosphates will also function at levels up to about 2% by weight to stabilize the emulsion without the presence of the phosphates being perceptible with respect to the organoleptic properties of the composition. However, the phosphates are less preferred because they tend to form insoluble products in the composition.

The powdered dairy creamer compositions of the present invention may optionally include one or more bulking agents at levels up to about 40% by weight. Typically, the bulking agent is utilized as replacement for the nonfat dry milk solids, and therefore, for every weight percent of bulking agent added to the composition, the amount of nonfat dry milk solid is preferably reduced by about 1 weight percent. Many of the emulsion stabilizers that do not detract from the organoleptic properties of the composition can be utilized as bulking agents, namely, the dextrins, maltodextrins, corn syrup solids, modified food starches, lecithin, microcrystalline cellulose, carrageenan, rice starch, marine colloids and vegetable gums. In other words, the compositions of the present invention can further include an additional quantity of the above-listed emulsion stabilizers as bulking agents, up to about 50% by weight of the composition. While the use of bulking agents provides a more economical product, such compositions are not preferred because the lower levels of nonfat dry milk solids detract from the composition flavor and nutritional value.

Within the 3-10% weight percent effective range of emulsion stabilizers, higher levels around 10% by weight are required for use with lower softening point unsaturated fats or oils. Preferred compositions in accordance with the present invention contain from about 5 to about 10 percent by weight of the one or more emulsion stabilizers.

The powdered dairy creamer compositions of the present invention also include optional flavoring agents to better approximate the organoleptic properties of fresh cream when the powdered creamer composition is added to a beverage such as coffee. Suitable flavoring agents include dried cream extract, calcium gluconate and the like. The dried cream extract can be present at levels between about 0.20 and about 2.5% by weight, and is preferably utilized at a level of about 1.5% by weight.

The powdered dairy creamer compositions of the present invention may also optionally contain one or more antioxidants present at levels effective to prevent oxidation of the composition. The antioxidants are preferably present at levels up to about 0.50% by weight. Any antioxidants suitable for use in a food product can be utilized in the powdered dairy creamer compositions of the present invention, at conventional levels established for the antioxidant. Preferred antioxidants include vitamin E dl alpha tocopherol, vitamin E dl alpha tocopherol acetate and ascorbal palmitate. The vitamin E-based antioxidants also provide nutritional value.

The powdered dairy creamer compositions of the present invention may also optionally include additional levels of whey up to a total amount of whey of about 15% by weight. The whey should be at least 50% demineralized. In addition to functioning as an emulsion stabilizer, the whey contributes nutritional values and contributes to the organoleptic properties of the powdered creamer composition to better approximate the taste and mouth feel of fresh cream.

As noted above, preferred compositions in accordance with the present invention optionally include vitamin and mineral additives to provide a powdered dairy creamer composition that also functions effectively as a nutritional supplement. The quantity of each vitamin or mineral to be added is well-understood to those of ordinary skill in the dietary and nutritional art, and will depend upon the dietary supplementation objectives of the formulator. For those vitamins and minerals for which Recommended Daily Allowances have been established, the compositions of the present invention can be formulated with the full Recommended Daily Allowance of each nutrient, or a fraction thereof. The compositions of the present invention are particularly useful as a vehicle for calcium supplementation, a mineral, the importance of which to the nutritional requirements of women has only recently been understood.

Examples of vitamins and minerals that can be added as nutritional supplements to the powdered dairy creamer compositions of the present invention include the vitamin E-based antioxidants disclosed above, vitamins A and D, which are typically added in corn oil, cyanocobalamine, calcium gluconate, potassium citrate, magnesium aspartate, selenium chelate, zinc succinate, calcium pantothentate, niacinamide ascorbate, pyridoxine hydrochloride, coenzyme Q 10, beta carotene and the like.

The powdered dairy creamer compositions of the present invention may also include additives that are conventional to the formulation of powdered and liquid, dairy and non-dairy creamer compositions, such as anti-caking agents that are utilized in powdered compositions and whitening agents such as titanium dioxide.

The powdered dairy creamer compositions of the present invention are prepared by forming an emulsion of the edible fat component and other oil-soluble ingredients with an aqueous solution of the water-soluble ingredients. Typically, the edible fat component is heated to a temperature above its melting point, preferably about 160° F. Both the hydrophilic and lipophilic emulsifiers are added to the melted fat, together with the oil-soluble vitamins and antioxidants, if any. In a separate container, a dry-blend is formed of the emulsion stabilizers, flavor additives such as dried cream extract, if any, and water-soluble vitamins and minerals, if any. The dry blend is then dissolved in a quantity of water equivalent to about 30% to about 60%, and preferably about 50%, of the total weight of the composition. The mixture is stirred using high agitation until dissolved and free from lumps and then heated to slightly above the temperature of the edible fat component-based mixture, preferably to about 160° F.

Once the aqueous solution reaches the desired temperature, the edible fat component-based mixture is added slowly with continued agitation. The mixture is then batch-pasteurized, typically for about 20-30 minutes at a temperature above 160° F. to obtain a pre-emulsion of the oil and water phases. The pre-emulsion is then homogenized in a two-stage pressure homogenizer at a pressure between about 2000 and about 4000 psi, and preferably between about 2,500 and about 3,500 psi, with a second-stage pressure of about 500 psi. Preferably, two passes of the pre-emulsion through the homogenizer are made, so that the oil particles in the resulting emulsion are consistent in size and average one micron or less in diameter. If there are any lumps, the emulsion should be sieved through a 20 mesh screen.

If the homogenized product is not to be powdered immediately, then it should be cooled rapidly to 38° F. and stored in a refrigerator or freezer. Prior to powdering, the product should be warmed to 110° F. for better flowability.

If the product is to be powdered by fluidized bed spray-drying, the nonfat dry milk powder and any whey, if utilized, is placed into the bowl of a fluid bed particle coater using a 100 mesh Dutch weave screen. The Dutch weave screen keeps the particles in the fluidized bed bowl, yet can be penetrated by the fluidizing air. The particles are then suspended in the fluidized bed bowl while sprayed from the top with fluidizing air containing the liquid emulsion. The nonfat dry milk powder particles and any whey particles are thereby coated by droplets of the liquid emulsion that forms an agglomerate of the dried materials.

The product should then be dried to 1-2% moisture and cooled to 22° C. in the process bed before packaging to prevent clumping.

A particularly useful powdered dairy creamer composition of the present invention contains about 20% by weight of an edible fat component of one or more edible fats, which component is solid at room temperature, about 50% by weight of nonfat dry milk powder, about 0.6% by weight of a hydrophilic emulsifier, about 0.3% by weight of a lipophilic emulsifier, about 6% by weight maltodextrin, about 11% by weight of 50% demineralized whey, about 1.5% weight sodium caseinate, about 0.6% by weight potassium citrate, about 0.6% by weight dipotassium phosphate, about 1.75% by weight dried cream extract, about 2% by weight modified food starch and about 1% by weight corn syrup solids. The edible fat component is preferably derived from partially hydrogenated vegetable oil containing greater than about 50% by weight of soybean or canola oil. The oil preferably contains greater than about 50% by weight of monounsaturates preferably has a melting point between about 105° F. and about 115° F. The nonfat dry milk is preferably low heat nonfat dry milk. The hydrophilic emulsifier is preferably sodium stearoyl-2-lactolate. The lipophilic emulsifier is preferably Polysorbate 60. The maltodextrin is preferably a 10 Dextrose Equivalent.

The preferred composition also contains about 1.8% by weight of vitamin E dl alpha tocopherol acetate and 0.04% by weight of vitamin E dl alpha tocopherol as an antioxidant and preservative. This preferred composition is also suitable for supplementation with other vitamins and minerals as described above.

It will be apparent that the compositions of the present invention can also be prepared by other conventional coating and drying techniques such as conventional spray drying, lyophilization, drum drying, roller drying, and the like. However, these methods are less preferred for two reasons. First, the nonfat dry milk powder and whey must be dissolved with the dry blend in the aqueous solution, requiring critical attention to be paid to the heat history of this solution to prevent denaturing of the proteins. In particular, the heating of the aqueous solution and the pasteurizing to form the pre-emulsion must be performed at temperatures less than about 180° C. to prevent denaturing of the milk and whey proteins. Second, the dried product must be formed into agglomerates, requiring an additional process step. Without agglomeration, the powder dissolves too slowly. The dried product can be agglomerated by conventional methods, for example, by coating with an aqueous starch mixture to adhere the powdered particles together.

The present invention also contemplates formation of the powdered dairy creamer compositions of the present invention utilizing skim milk rather than nonfat dry milk powder. The process of the present invention is then modified so that the aqueous solution is prepared with a quantity of skim milk sufficient to provide the desired level of nonfat dry milk solids. Again, care is taken with the heat history of the aqueous solution and resulting emulsion to prevent denaturing of the skim milk proteins. The resulting product cannot be dried by a fluidized bed process, and is instead dried by the above-described techniques of conventional spray drying, lyophilization, drum drying, roller drying, and the like, followed by agglomeration of the resulting powder.

The present invention also contemplates utilizing butterfat containing milk such as whole milk or reduced-butterfat milk instead of skim milk. The butterfat functions as the edible fat component. Thus, the present invention includes powdered dairy creamer compositions in which both the edible fat component and nonfat milk solids or nonfat dry milk solids are all derived from butterfat-containing milk that is added to the aqueous solution to be emulsified with the edible fat component.

It will also be apparent that the compositions of the present invention can be formed into liquid dairy creamer products by evaporating a portion of the water from the emulsion to obtain the desired solids level, rather than drying the emulsion to a 1-2% moisture level. Liquid dairy creamer products can also be prepared by reconstituting the powdered dairy creamer compositions of the present invention.

The powdered dairy creamer compositions prepared in accordance with the present invention are directly useable in creaming coffee and other beverages as well as other liquid food products such as soups. Its properties as a creaming powder may be illustrated by its behavior when used in coffee. When the powder in the desired quantity is added to hot coffee, it wets rapidly and disperses upon slight stirring into a homogeneous mixture with the coffee without feathering, breaking or curdling. The whitening and creaming effect is the same as or better than that of coffee cream or of evaporated milk. The coffee to which the creaming powder of the present invention is added is identical not only in appearance, but also in organoleptic properties such as flavor and mouthfeel with equivalent coffee to which a quantity of fresh cream has been added sufficient to give the same whitening effect.

The following non-limiting examples set forth hereinbelow illustrate certain aspects of the invention, but are not meant in any way to restrict the effective scope of the invention. All parts and percentages are by weight unless otherwise noted, and all temperatures are in degrees Celsius, unless otherwise noted.

EXAMPLES

EXAMPLE 1

A pre-emulsion for a powdered dairy creamer composition was prepared by first melting at 160° C. Super Fry C TM Oil (Karlsham, Columbus, Ohio) a partially hydrogenated blend of soybean and cottonseed oils containing 28% saturates, 64% monounsaturates and 8% polyunsaturates, and having a melting point between 107° F. and 110° F. To the oil is added 41.68 g Emulsilac TM, a sodium stearoyl-2-lactolate hydrophilic emulsifier, and 20.84 g Polycon T60K TM Polysorbate 60 lipophilic emulsifier. 126 g vitamin E dl alpha tocopherol acetate and 2.78 g vitamin E dl alpha tocopherol are added to the oil as an antioxidant and nutritional supplement. To this was added 0.0315 g of a mixture of vitamin A palmitate and vitamin $D_3$ in corn oil was also added to the oil, which vitamin mixture contained 1,000,000 IU of the vitamin A and 200,000 IU of the vitamin $D_3$ per gram.

In a separate container, the following dry, water-soluble ingredients were dry-blended:

| INGREDIENT | QUANTITY |
|---|---|
| Maltodextrin (10 DE) | 420 g |
| Sodium Caseinate | 111 g |
| Dried Cream Extract (Cumberland Packing Corporation, Racine, WI) | 125 g |
| Modified Food Starch (Capsul ®) (National Starch and Chemical Bridgewater, New Jersey) | 155 g |
| Corn Syrup Solids | 70 g |
| Vitamin B-12 | 8.4 g |
| Calcium Gluconate | 17.85 g |
| Potassium Citrate | 10.65 g |
| Magnesium Aspartate | 15.12 g |
| Selenium Chelate | .017 g |
| Zinc Succinate | 1.008 g |
| Calcium Pantothenate | 8.4 g |
| Niacinamide Ascorbate | 6.3 g |
| Pyridoxine Hydrochloride | 36 g |

The nutritional supplemental additives were obtained from Roche of Nutley, New Jersey and Weinstein Chemical of Costa Mesa, Calif.

The dry blend was dissolved in 3.9 kg of water using high agitation until the solution was completely dissolved and free from lumps. The solution was then heated to 160° F. with continued agitation. Once heated, the oil-phase materials were added slowly to the aqueous solution with continued agitation. The resulting mixture was then batch pasteurized by heating at 175° C. for 25 minutes to form a pre-emulsion. The pre-emulsion was then homogenized by passing it twice at 3,000 psi (205 bar) through a Gaullin pressure homogenizer. In the resulting emulsion, the oil particles were consistent in size and averaged less than one micron in diameter.

3.15 kg low heat nonfat dry milk powder and 787.5 g. of 50% demineralized whey were then placed into the bowl of a fluid bed particle coater, namely a Glatt Powder Coater Granulator. The liquid emulsion and nonfat dry milk powder-whey blend were then fed to the fluidized product bed. The emulsion was fed through the top spray nozzle position and sprayed onto the powdered milk-whey combination, with a 100 mesh Dutch Weave screen used to contain the nonfat dry milk powder and resulting agglomerates in the particle bed. The inlet temperature was set at 85° C. and the product temperature was set at 68° C. The outlet flap was set at 35% open, and the flow rate set at 100 g/min.

Once the particle coating was complete, the product was dried to 1% moisture and cooled to 22° C. in the process bed, and then recovered.

On testing the powder in coffee at 180° F., it showed the characteristic properties of the powders prepared in accordance with the present invention as described above. The powder rapidly dispersed on stirring and showed excellent whitening powder. No floating oil particles were present and no feathering or other objectionable appearance was produced.

As will be readily appreciated, numerous variations and combinations of the features set forth above can be utilized without departing from the present invention is set forth in the claims. Such variations are not regarded as a departure from the spirit and scope of the invention, and all such modifications are intended to be included within the scope of the following claims.

What is claimed is:

1. A powdered dairy creamer composition formed by drying an emulsion comprising:
   from about 5% to about 45% by weight of an edible fat component comprising one or more edible fats;
   from about 5% to about 75% by weight of nonfat dry milk solids;
   from about 0.15% to about 1.5% by weight of an emulsifier system consisting essentially of a hydrophilic emulsifier and a lipophilic emulsifier, which are present in a ratio of about 2:1;
   one or more first emulsion stabilizers, selected from the group consisting of dextrins, maltodextrins, modified food starches, corn syrup solids, lecithin, microcrystalline cellulose, carrageenan, rice starch, marine colloids, vegetable gums and whey demineralized 50% or greater, provided that the level of whey does not exceed about 15% by weight present in an amount effective to stabilize said emulsion without the presence of said stabilizer being perceptible with respect to the organoleptic properties of said composition; and
   0.8% to 2.7% of a second emulsion stabilizer selected from the group consisting of caseinate salts, citrate salts, phosphate slats and mixtures thereof.

2. The powdered dairy creamer composition of claim 1, wherein said nonfat dry milk solids comprise low heat nonfat dry milk solids.

3. The powdered dairy creamer composition of claim 1, wherein said nonfat dry milk solids are present at a level between about 30% and about 60% by weight.

4. The powdered dairy creamer composition of claim 1, wherein said edible fat component has a melting point between about 100° F. and about 120° F.

5. The powdered dairy creamer composition of claim 1, wherein said edible fat component consists essentially of vegetable fats and oils selected from the group consisting of saturated vegetable fats and oils, monounsaturated vegetable fats and oils, polyunsaturated vegetable fats and oils and mixtures thereof.

6. The powdered dairy creamer composition of claim 5, wherein said vegetable fats and oils comprise partially hydrogenated vegetable fats and oils.

7. The powdered dairy creamer composition of claim 5, wherein said vegetable fats and oils are selected from the group consisting of soybean oil, palm oil, coconut oil, cottonseed oil, canola oil and mixtures thereof.

8. The powdered dairy creamer composition of claim 1, wherein said edible fat component is present at a level between about 10% and about 30% by weight.

9. The powdered dairy creamer composition of claim 1, wherein said hydrophilic emulsifier is present at a level of about 0.3% by weight and said lipophilic emulsifier is present at a level of about 0.15% by weight.

10. The powdered dairy creamer composition of claim 1, wherein said hydrophilic emulsifier comprises sodium stearyl-2-lactolate, and said lipophilic emulsifier comprises polyoxyethylene sorbitan monostearate.

11. The powdered dairy creamer composition of claim 1, comprising from about 3% to about 10% by weight of said first and second emulsion stabilizers.

12. The powdered dairy creamer composition of claim 1, further comprising between about 0.2% to about 2.5% by weight of dried cream extract.

13. The powdered dairy creamer composition of claim 1, further comprising one or more nutritional supplements selected from the group consisting of vitamin E dl alpha tocopherol acetate, vitamin E dl alpha tocopherol, vitamin A, vitamin D, calcium gluconate, potassium citrate, magnesium aspartate, selenium chelate, zinc succinate, calcium pantothenate, niacinamide ascorbate, phridoxine hydrochloride, coenzyme Q 10, beta carotene and cyanocobalamine.

14. The powdered dairy creamer composition of claim 1, comprising:
   from about 10% to about 30% by weight of an edible fat component consisting essentially of vegetable fats and oils;
   from about 30% to about 60% by weight of low heat nonfat dry milk solids;
   from about 0.6% to about 1.2% by weight of said emulsifier system;
   from about 10% to about 15% by weight of whey that is at least 50% demineralized;
   from about 0.4% to about 0.8% by weight of potassium citrate;
   from about 0.4% to about 0.8% by weight of dipotassium phosphate;
   from about 1% to about 2% by weight of dried cream extract; and
   from about 3% to about 10% by weight of one or more first emulsion stabilizers selected from the group consisting of dextrins, maltodextrins, modified food starches, corn syrup solids, lecithin, microcrystalline cellulose, carageenan, rice starch, marine colloids and vegetable gums.

15. The powdered dairy creamer composition of claim 14, wherein said maltodextrins are 10 DE maltodextrins.

16. The powdered dairy creamer composition of claim 14 further comprising one or more nutritional supplements selected from the group consisting of vitamin E dl alpha tocopherol acetate, vitamin E dl alpha tocopherol, vitamin A, vitamin D, calcium gluconate, potassium citrate, magnesium aspartate, selenium chelate, zinc succinate, calcium pantothenate, niacinamide ascorbate, pyridoxine hydrochloride, coenzyme Q 10, beta carotene and cyanocobalamine.

* * * * *